United States Patent [19]

Welcher et al.

[11] 4,171,671
[45] Oct. 23, 1979

[54] AUTOMATIC STITCHING APPARATUS

[75] Inventors: Ray E. Welcher, Danvers; John F. Martin, South Essex; Michael J. Fino, Malden; Adolph S. Dorosz, Beverly, all of Mass.

[73] Assignee: USM Corporation, Farmington, Conn.

[21] Appl. No.: 867,926

[22] Filed: Jan. 9, 1978

[51] Int. Cl.$^2$ ................. D05B 21/00; D05B 33/00
[52] U.S. Cl. .................. 112/121.12; 112/121.29; 112/307
[58] Field of Search .......... 112/121.12, 121.11, 112/121.15, 121.29, 203, 207; 271/84

[56] References Cited

U.S. PATENT DOCUMENTS

| | | | |
|---|---|---|---|
| 3,752,097 | 8/1973 | Fuller, Jr. et al. | 112/121.29 |
| 3,793,968 | 2/1974 | Beazley | 112/121.29 |
| 3,810,414 | 5/1974 | Gerber | 112/121.12 X |
| 3,951,400 | 4/1976 | Blessing et al. | 112/121.29 |
| 3,982,491 | 9/1976 | Herzer et al. | 112/121.12 |
| 4,050,393 | 9/1977 | Welcher et al. | 112/121.12 |
| 4,051,794 | 10/1977 | Herzer et al. | 112/121.12 |

Primary Examiner—H. Hampton Hunter
Attorney, Agent, or Firm—William F. White; Richard B. Megley; Vincent A. White

[57] ABSTRACT

An automatic sewing machine is provided wherein the clamps for holding the workpiece can be used to define at least two different sewing patterns. The sewing pattern which is particularly defined by a given arrangement of clamps is indicated to a digital control system within the sewing machine. The control system is operative to subsequently implement an automated stitching of the particular sewing pattern which has thus been indicated thereto. This automatic stitching is accomplished through a sequential reading of a set of instructions previously stored within a memory associated with the control system. The set of instructions remain the same for at least two different sewing patterns. These instructions are altered upon read out by certain control logic which takes note of which pattern has been defined by the given arrangement of clamps. The automated stitching is completed by an automatic ejection of the clamped workpiece.

50 Claims, 12 Drawing Figures

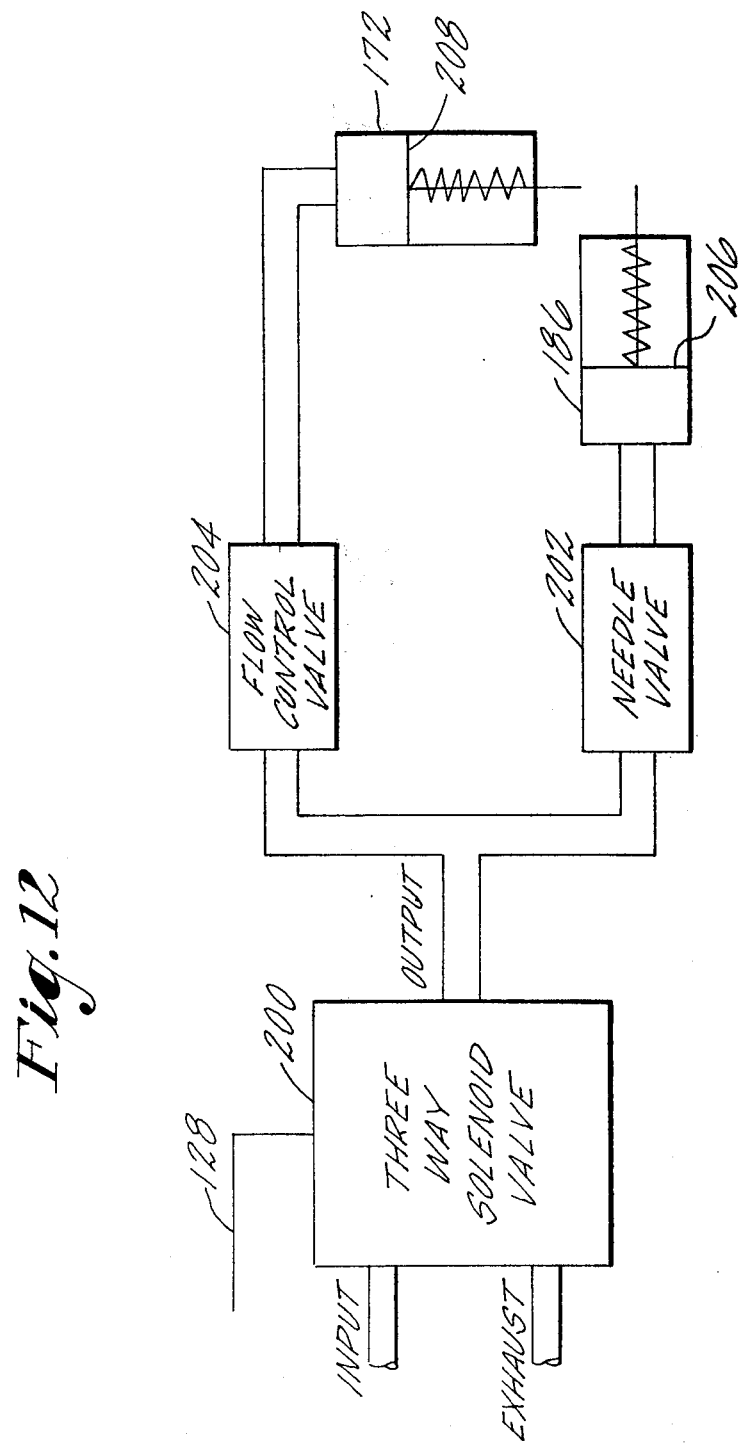

AUTOMATIC STITCHING APPARATUS

FIELD OF THE INVENTION

This invention relates to automatically controlled sewing machines. In particular, this invention relates to apparatus for automatically controlling the manner in which patterns are to be sewn on a workpiece.

BACKGROUND OF THE INVENTION

Systems for automatically controlling the manner in which a pattern is to be sewn on a workpiece have been heretofore used widely in the garment and shoe industries. Such systems were at one time largely mechanical in nature and included various mechanical memory elements which would dictate the pattern of movement of the workpiece. These systems have been replaced to a large extent by digital control logic which utilizes a digital storage device for the purpose of dictating the pattern of movement. These digital storage devices can include among other things: a paper tape, a magnetic tape, or an electronic memory such as a read only memory or a programmable read only memory otherwise known as a ROM or PROM. The pattern of movement which is usually stored in these various storage devices is sequentially accessed by the digital control logic in such a manner as to control the movement of the workpiece relative to the sewing head.

It is to be appreciated that the patterns of movement which are thus stored within the digital storage device may require a considerable amount of storage space. In addition, the digital storage device may also be required to store information other than that specifically relating to the controlled movement of the workpiece. In this regard, the digital storage device may contain information relating to stitching parameters. This results in a considerable demand being placed upon the limited storage space within the given storage element.

It is also to be appreciated that provision must be made for securely holding the workpiece when the same is being moved by the digital control logic pursuant to the reading of a particular stored pattern of movement. In this regard, most automatic sewing machines include a clamping mechanism which holds the workpiece during the entire automatic sewing operation. These clamping mechanisms are usually configured for the particular sewing pattern which is to be sewn. This requires an individual clamping mechanism for each and every sewing pattern that is to be automatically sewn.

Clamping mechanisms moreover do not provide for an expeditious unloading of the workpiece when the same has been completely stitched. In this regard, the necessity for securely clamping the workpiece during the sewing operation is considered more important than the need to provide a mechanism for quickly ejecting the completed workpiece.

OBJECTS OF THE INVENTION

It is an object of this invention to provide a new and improved control system which moves the workpiece within an automatic sewing machine.

It is another object of this invention to provide a digital control system having an improved utilization of the storage space within the storage device containing the pattern of movement for the workpiece.

It is still another object of this invention to provide a clamping mechanism having a flexible capability with regard to defining the sewing pattern.

It is a still further object of this invention to provide a mechanism which cooperates with the clamping mechanism so as to automatically eject the workpiece following the completion of a sewing operation.

SUMMARY OF THE INVENTION

The above objects are achieved according to the present invention by providing an automatic sewing machine with a digital control system that interfaces with a set of clamps capable of defining more than one stitching pattern. The clamps define the different stitching patterns when inserted in different manners within the sewing machine. The particular stitching pattern which is thus defined upon insertion of the clamps is indicated to the digital control system. The control system is operative to subsequently implement the stitching of the particular sewing pattern which has thus been indicated. The automatic stitching is accomplished through a sequential reading of a set of instructions which have been previously stored within a memory associated with the control system. The same set of instructions can be used for automatically stitching at least one different sewing pattern. With regard to the pattern which is to be particularly sewn, the digital control system is operative to sequentially read each instruction from memory upon completion of the last stitching operation. The digital control system is furthermore operative to cut the thread and automatically eject the workpiece when the particular sewing pattern has been completed.

BRIEF DESCRIPTION OF THE DRAWINGS

The above and other features of the invention will now be particularly described with reference to the accompanying drawings, in which:

FIG. 12 illustrates the air valve control system for the workpiece ejector of FIGS. 10 and 11.

DESCRIPTION OF THE PREFERRED EMBODIMENT

Figure 1:
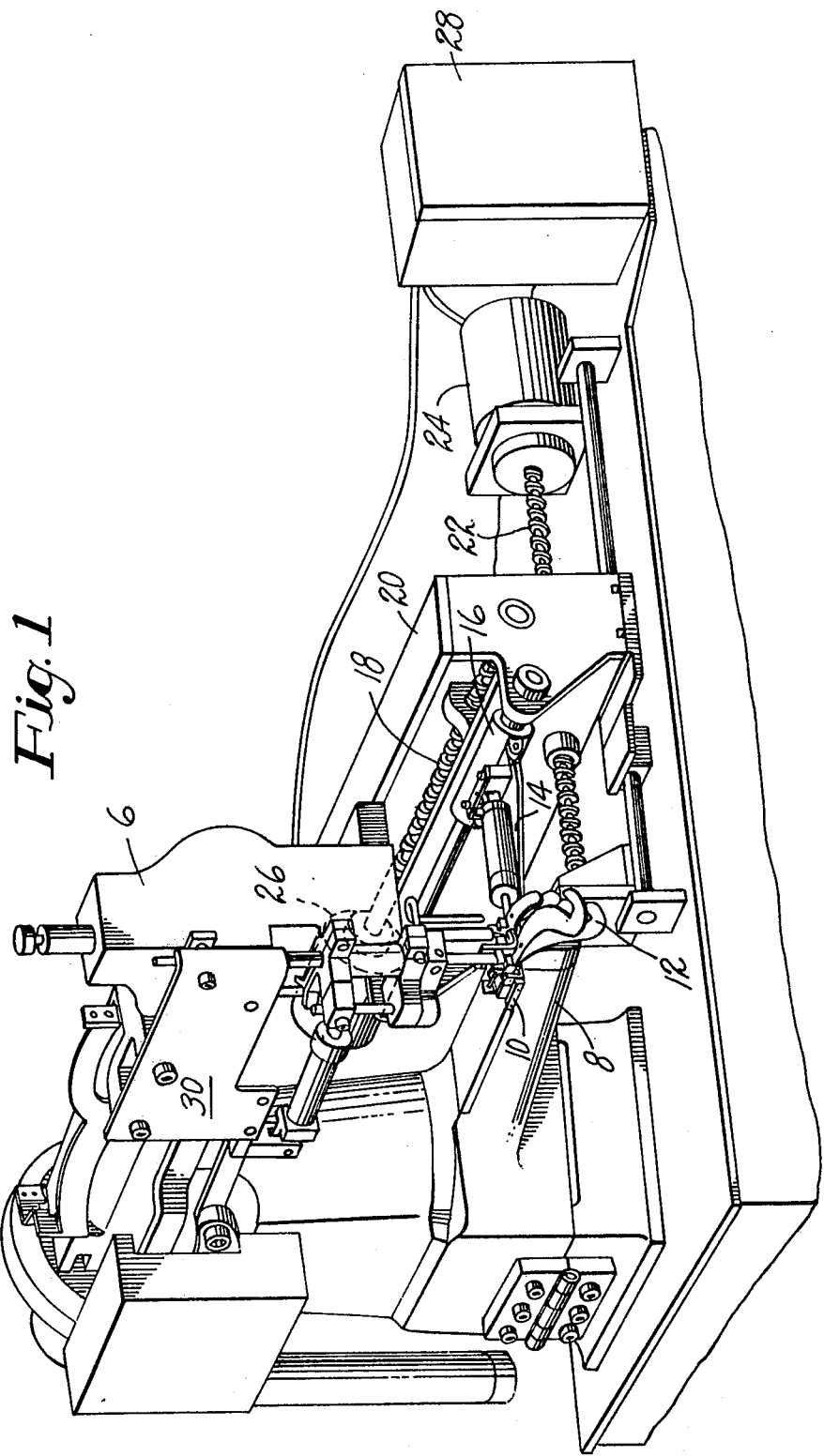
FIG. 1 is a perspective view of a sewing machine having apparatus for moving a clamped workpiece within the sewing area and furthermore having an ejector for ejecting the clamped workpiece.

Referring to FIG. 1, an automatic sewing machine having a sewing head 6 and a sewing bed 8 is generally illustrated. Resting on the sewing bed 8 is a carriage 10 containing a plurality of clamps 12 which receive a workpiece (not shown).

The carriage 10 includes an arm 14 which is rotatably connected to a transport 16. The transport 16 is moved forward and backward by a ball screw drive 18. The ball screw drive 18 is mounted within a movable platform 20 which is driven laterally from side to side by a ball screw drive 22. The side to side lateral movement of the platform 20 will hereinafter be referred to as the X direction of movement whereas the forward and backward movement of the transport 16 will be referred to as the Y direction of movement. It is to be appreciated that the X direction of movement of the platform 20 will be superimposed on the Y direction of movement of the transport 16 so as to thereby cause the carriage 10 to move in any desired direction with respect to the sewing head 6.

The amount of X and Y movement is preferably governed by a pair of servo motors associated with each ball screw drive. Specifically, a servo motor 24, associated with the ball screw drive 22, defines the amount of movement in the X direction. A servo motor 26 mounted on the backside of the platform 22 defines the amount of movement in the Y direction. The servo motors are driven by a digital control system 28 which generates a train of pulses to each motor indicating the amount of X and Y movement. This is done in timed synchronization with the movement of the sewing needle within the sewing head 6. In this manner, the desired X and Y movements do not interfere with the movement of the sewing needle through the workpiece.

A work ejector 30 is also associated with the automatic sewing machine. The work ejector 30 is operative to eject a workpiece from the clamps upon completion of the sewing operation.

Figure 2:
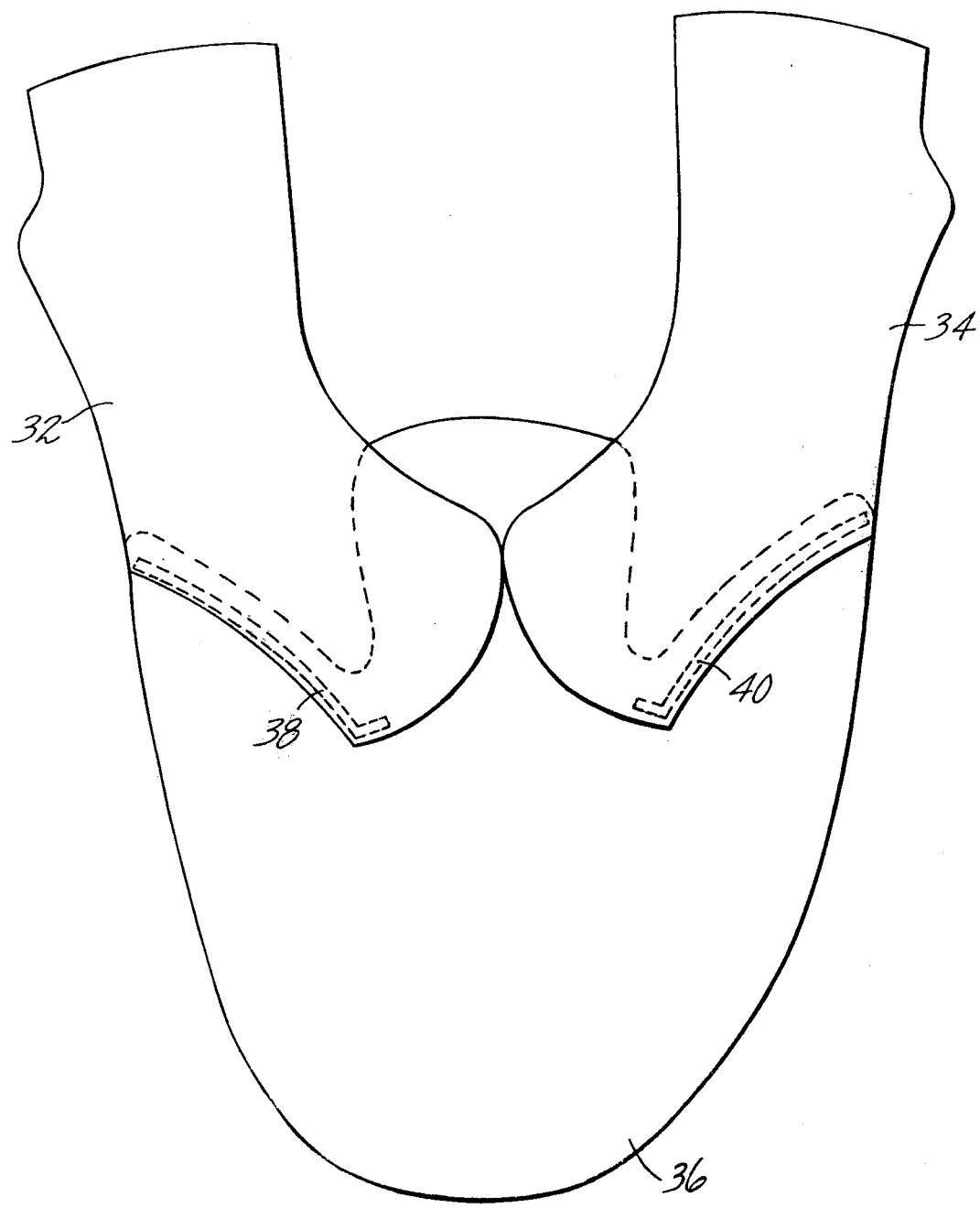
FIG. 2 is a view of an exemplary workpiece which is to be stitched in either of two directions.

Referring now to FIG. 2, an example of a workpiece which is to be stitched by the sewing machine is generally illustrated. The exemplary workpiece of FIG. 2 is illustrative of a sewing operation for a shoe. It is to be appreciated that automatically controlled stitching for other applications is also contemplated by the invention. The workpiece in FIG. 2 consists of a pair of shoe quarter portions 32 and 34 which are to be stitched to a vamp 36. The particular stitch which is required in each instance is that of a vamping stitch. These vamp stitches are denoted as 38 and 40 in FIG. 2. It is to be noted that these stitches are mirror images of each other. In other words, each stitch extends in a direction opposite to the other.

The opposite directional nature of these stitching patterns will be hereinafter referred to by denoting the stitching pattern 38 as "a normal pattern" and the stitching pattern 40 as "the opposite pattern". It is to be appreciated that this referencing is entirely arbitrary insofar as the practice of the invention.

Figure 3:
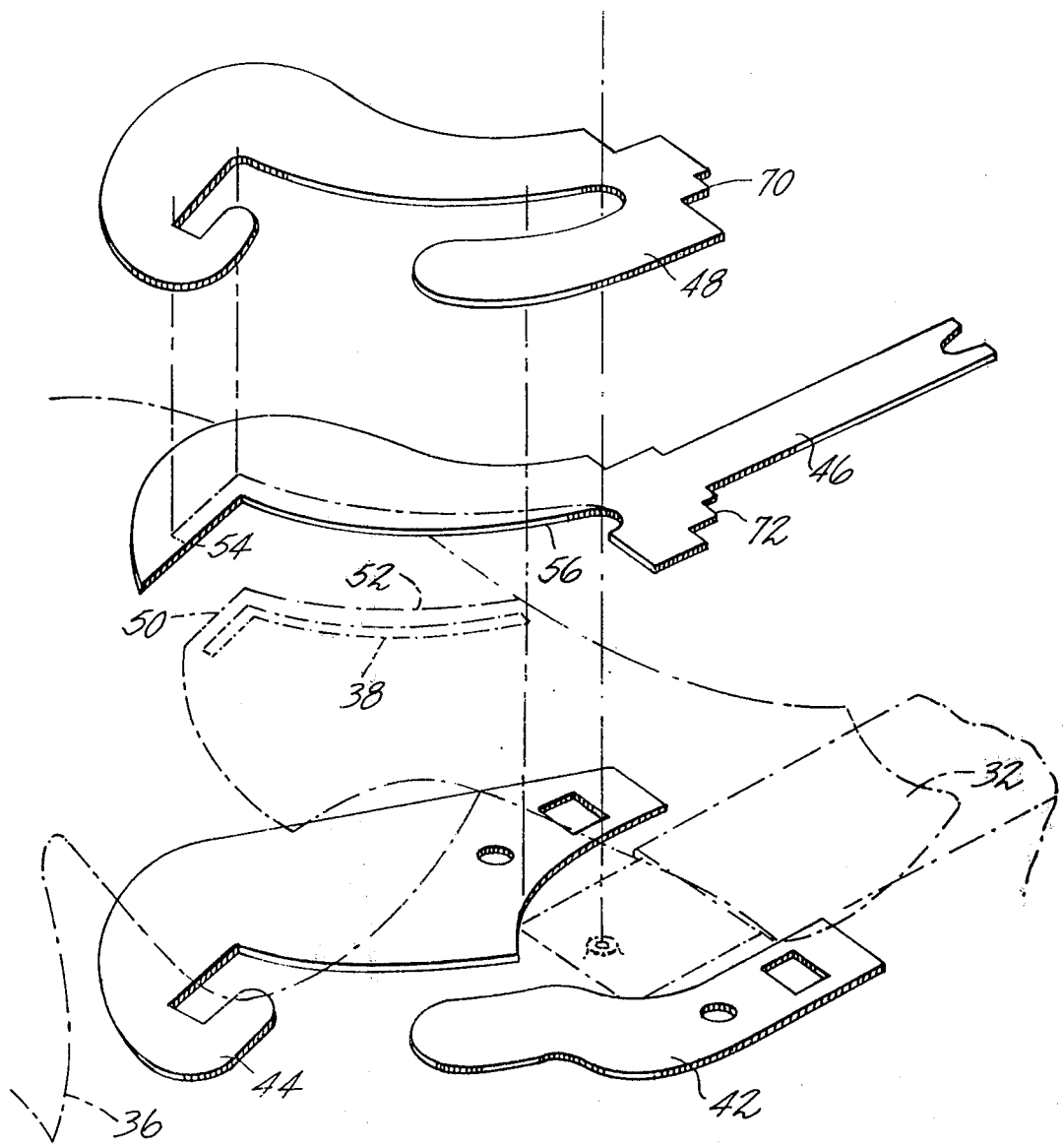
FIG. 3 is an exploded view of the clamp elements used to clamp the workpiece of FIG. 2.

Referring now to FIG. 3, dotted outlines of the shoe quarter 32 and the shoe vamp 36 are shown relative to a plurality of clamps. The clamps consist of a pair of lower clamps 42 and 44, a gauge 46, and an upper clamp 48. The shoe quarter 32 and the shoe vamp 36 are to be securely held together by these various clamps during the sewing of a normal pattern 38 which is denoted in dotted outline form. The sewing of the normal pattern 38 occurs after the workpiece has been aligned with respect to the gauge 46 and clamped between the upper and lower clamps.

The alignment of the workpiece with respect to the gauge 46 is preceded by an alignment of the shoe quarter 32 relative to the shoe vamp 36. This is preferably accomplished by aligning the edges 50 and 52 of the shoe quarter with respect to a previously inscribed line (not shown) on the shoe vamp 36. The thus aligned pieces of material are next positioned with respect to the gauge 46. In this regard, the edges 50 and 52 of the shoe quarter are aligned with respect to the interior edges 54 and 56 of the gauge. The thus aligned workpiece will be clamped between the upper clamp 48 and the lower clamps 42 and 44. In this regard, the various clamp elements will securely hold the workpiece around the periphery of the normal pattern 38.

Figure 4:
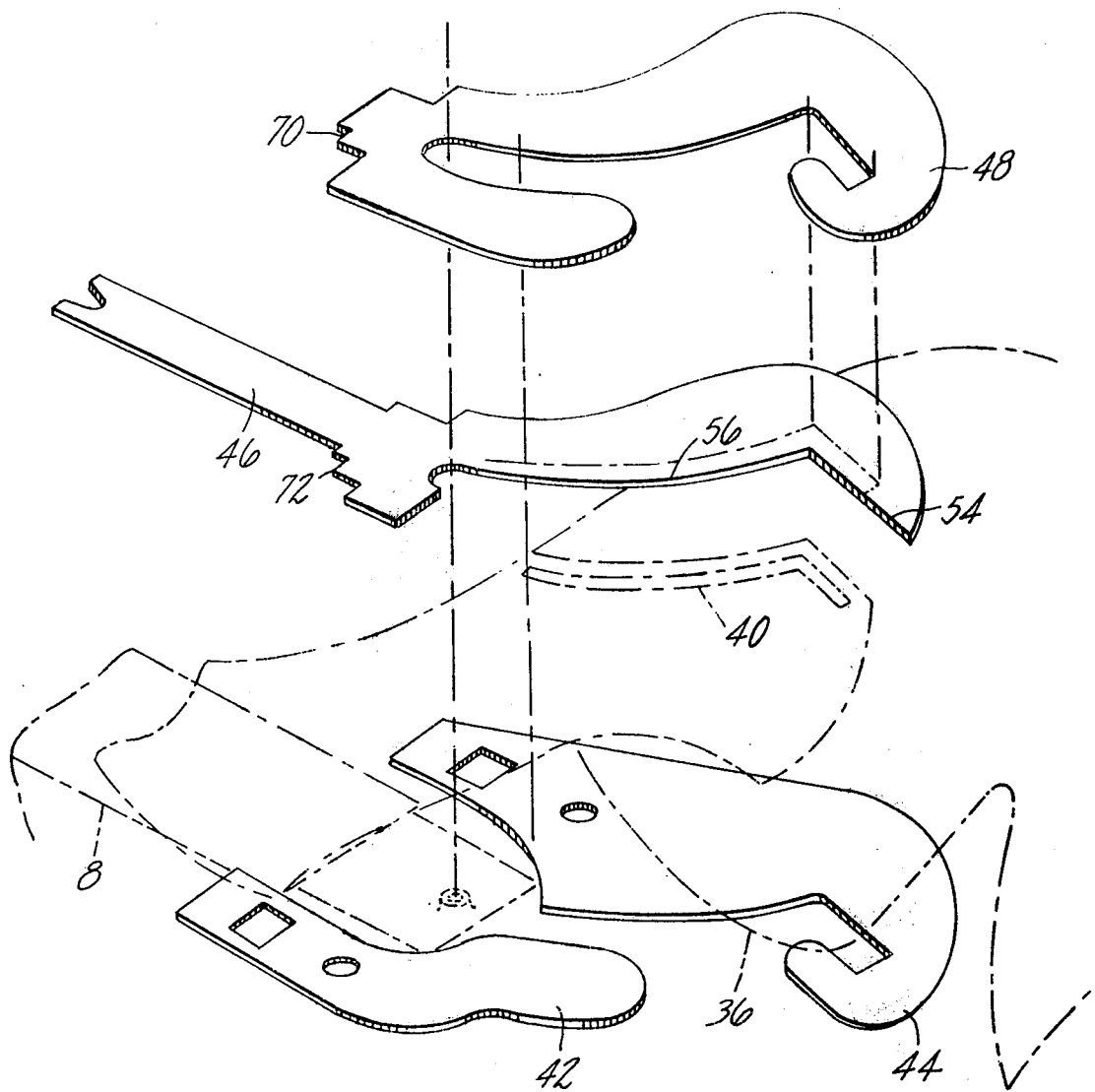
FIG. 4 is an exploded view of the clamp elements arranged in an alternate manner relative to the workpiece of FIG. 2.

It is to be appreciated that the same clamp elements 42 through 48 can be utilized to align and secure the shoe quarter 34 with respect to the shoe vamp 36. This is clearly illustrated in FIG. 4, wherein all clamp members have been turned over and the positions of the lower clamps 42 and 44 have been interchanged. The shoe quarter 34 (which has been previously aligned with respect to an inscribed line on the shoe vamp 36) is aligned with respect to the interior edges 54 and 56 of the gauge. The thus aligned workpiece consisting of the shoe quarter 34 and the shoe vamp 36 will be clamped between the upper and lower clamps so as to define a sewing area for a stitching of the opposite pattern 40.

The aforementioned feature of utilizing one set of clamps to hold and secure different pieces of material for the sewing of different sewing patterns is premised on the ability to turn over the various clamps and interchange the positions of some of these clamps. This requires a carriage 10 which can receive these clamps in alternative ways.

Figure 5:
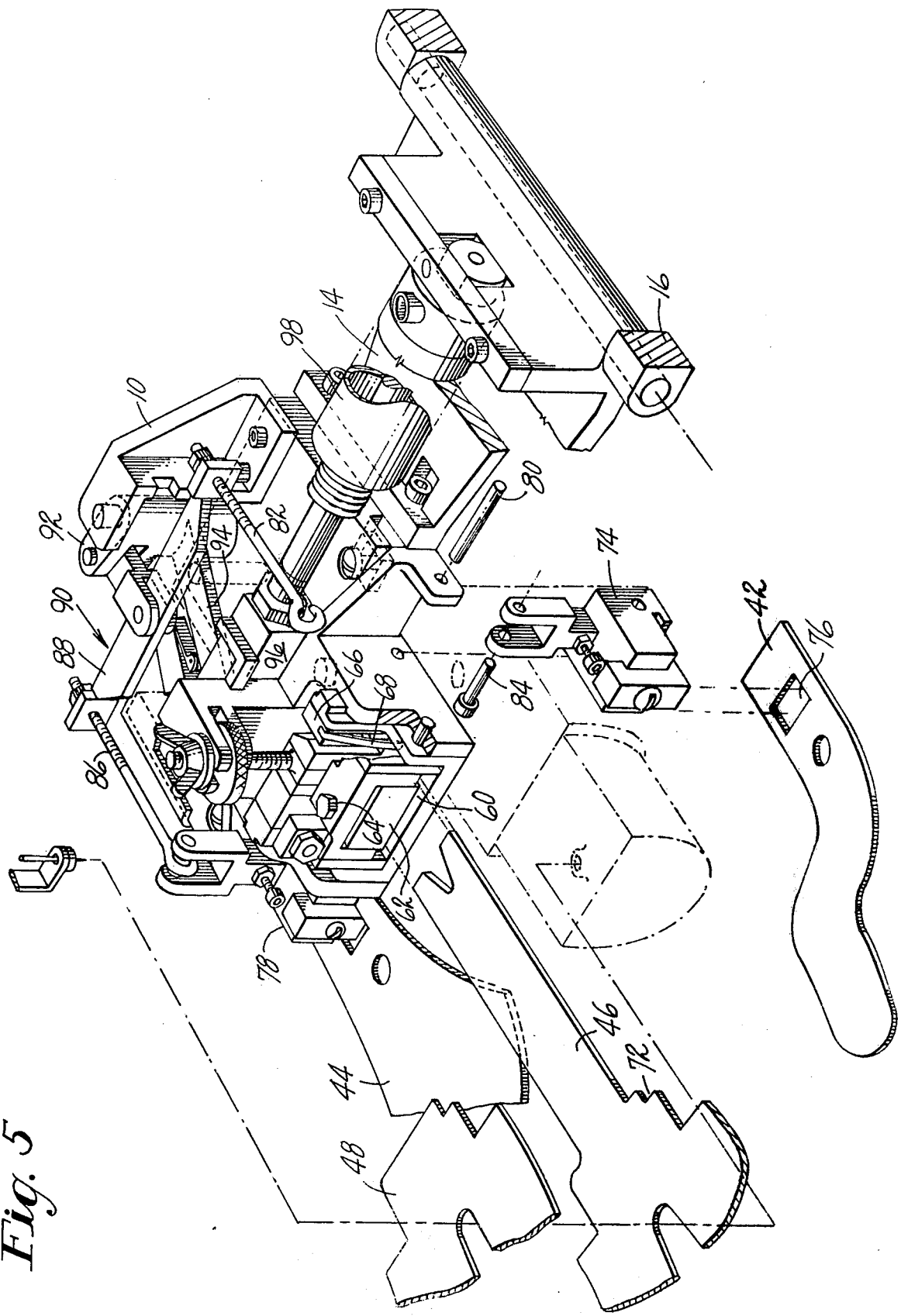
FIG. 5 is an illustration of how the clamp elements of FIG. 3 are inserted into the sewing machine of FIG. 1.

Referring now to FIG. 5, it is seen that the various clamps are inserted into the carriage 10. In particular, the gauge 46 and the upper clamp 48 are inserted into an opening 60 located at the front of the carriage 10. The gauge 46 and the upper clamp 48 are secured within the opening 60 by a clamp-holding member 62. The clamp-holding member 62 moves downwardly into pressurized contact with the upper clamp 48 upon rotation of a clamp adjustment screw 64. Further details of the clamp-holding member 62 are disclosed in commonly assigned U.S. patent application Ser. No. 867,927, entitled "Apparatus for Holding Work in a Sewing Machine", filed on Jan. 9, 1978, in the names of Adolph S. Dorosz, Edward S. Malecki, John F. Martin, Herbert Johnson, and Frances A. Wickers.

Positioned behind the clamp-holding member 62 is a limit switch 66. The limit switch 66 contains a reed 68 which extends downwardly into the opening 60 that receives the gauge 46 and the upper clamp 48. The limit switch 66 is appropriately activated when the reed 68 is depressed by engagement with the upper clamp 48 and the gauge 46.

It is to be noted that the upper clamp 48 contains a notch 70 at the right corner of its leading edge. A similar notch 72 appears in a corresponding location on the gauge 46. It is to be appreciated that the notch 70 will occur at the left corner of the leading edge when the upper clamp is turned over. The notch 72 will be similarly aligned underneath the notch 70 when the gauge 46 is turned over. It is thus to be appreciated that only one corner will be notched when the upper clamp 48 and the gauge 46 are inserted into the opening 60. This notched corner will be sufficient to prevent any depression of the reed 68 when the same occurs on the right as is illustrated in FIG. 5. On the other hand, the reed 68 will be depressed when the upper clamp 48 and the gauge 46 are turned over and inserted into the opening 60.

Referring to FIG. 3, it is seen that the notched corners 70 and 72 occur on the right for a normal pattern 38. This will result in the reed 68 not being depressed when the gauge 46 and upper clamp 48 are inserted. On the other hand, the reed 68 will be depressed when the gauge 46 and the upper clamp 48 are turned over as in FIG. 4 so as to define the opposite sewing pattern 40. In this latter case, an unnotched corner will be presented to the reed 68 causing the same to be depressed.

The limit switch 66 is connected to the digital control logic 28. The activation of this switch for the opposite sewing pattern 40 will result in a signal being transmitted to the digital control logic 28. The manner in which this signal is utilized will be described in detail hereinafter.

The lower clamp members 42 and 44 attach to different portions of the carriage 10. In particular, the bottom clamp 42 is connected to a pivotal member 74. This particular connection is made by inserting the leading edge of the lower clamp 42 into a bottom recession in the pivotal member 74. The lower clamp 42 is locked into place by registering a rectangular slot 76 in the lower clamp with a downwardly extending portion of the pivotal member 74. In a similar fashion, the lower clamp 44 is connected to a pivotal member 78 located on the opposite side of the carriage 10. It is to be understood that the clamps 42 and 44 may be turned over and interchanged with respect to the pivotal members 74 and 78.

The pivotal member 74 is rotatably attached to the carriage 10 through a cylindrical insert 80. A similar rotatable mounting is provided for the pivotal member 78. The pivotal member 74 is furthermore rotatably connected to a linkage member 82 via a pin 84. A similar linkage member 86 is rotatably connected to the pivotal member 78. The linkage members 82 and 86 are slidably connected to a yoke 88 which is in turn pivotally connected to a lever 90 of a bell crank 92. An arm 94 of the bell crank is pivotally connected to an extension 96 of an air-actuated piston within a cylinder 98.

Figure 6:
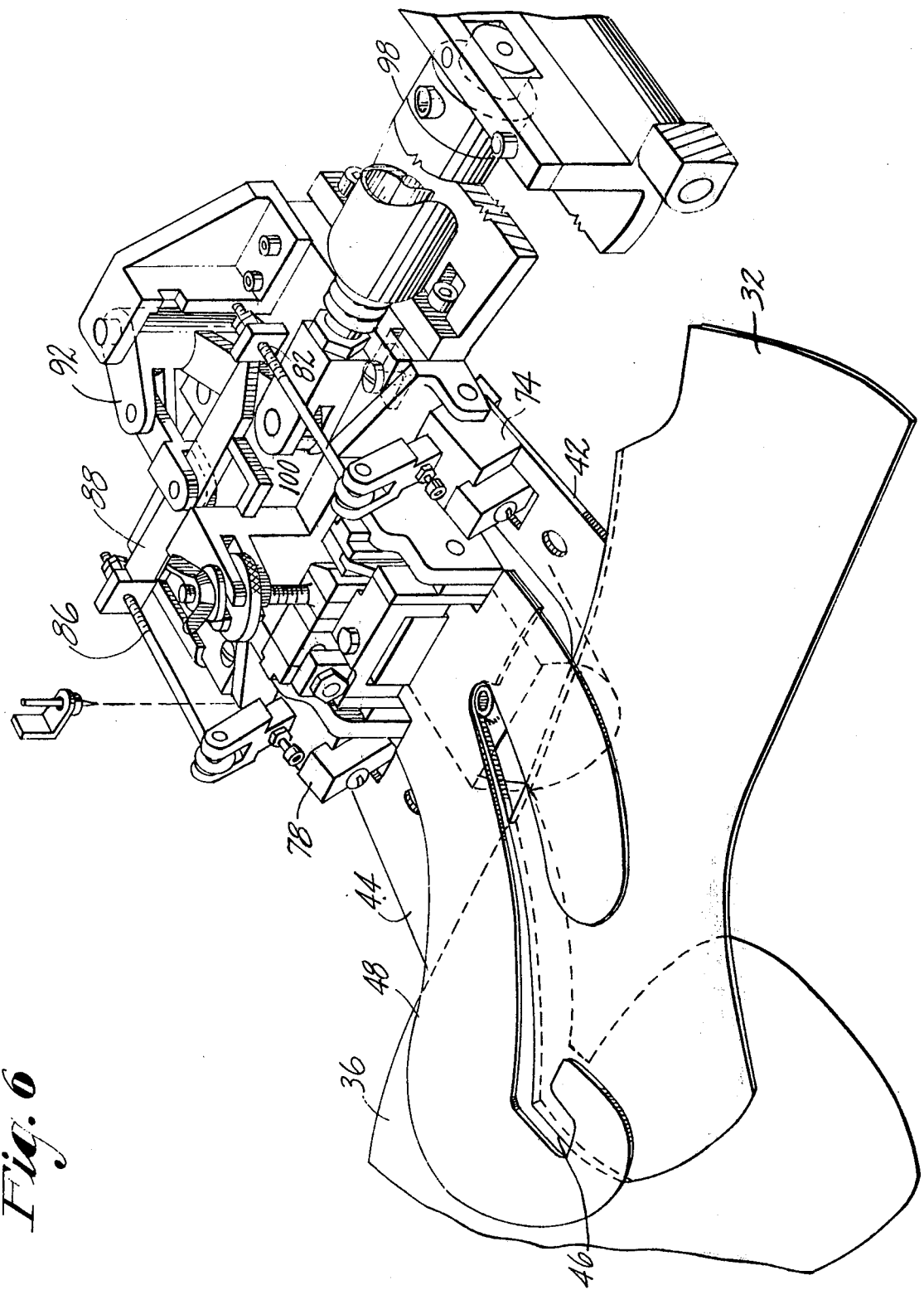
FIG. 6 illustrates the aligning of a workpiece with respect to the inserted clamp elements.

Referring to FIG. 6, the movement of the air-actuated piston within the cylinder 98 is illustrated. In particular, the air-actuated piston is shown in a fully retracted position. This has caused a counter-clockwise rotation of the bell crank 92 which in turn has caused the yoke 88 to move forward into contact with an abutment 100. The linkage arms 82 and 86 have moved outwardly with the yoke 120 so as to allow the pivotal members 74 and 78 to rotate downwardly. The downward position of the pivotal members constitutes an open clamp position which allows for an insertion of a workpiece.

The particular workpiece which is illustratively shown in FIG. 6 consists of the two pieces of material which were previously depicted in FIG. 3. It will be remembered from the discussion of FIG. 3 that the shoe quarter 32 is first aligned with respect to a previously inscribed line on the vamp 36. The thus aligned pieces constitute the workpiece which is to be inserted underneath the upper clamp 48 in FIG. 6. The insertion of the workpiece underneath the upper clamp 48 includes an alignment of certain edges of the shoe quarter 32 relative to the contour of the gauge 46. This has been previously discussed with regard to FIG. 3. Once this initial alignment has occurred, the operator causes a first air pressure to act upon the piston within the cylinder 98. This causes the lower clamps 42 and 44 to pivot upwardly and clamp the workpiece at a relatively low clamping pressure. After final adjustment of the workpiece, the operator causes a second pressure to be applied to the air-actuated piston within the cylinder 98 so as to produce a final clamping pressure on the workpiece.

Figure 7:
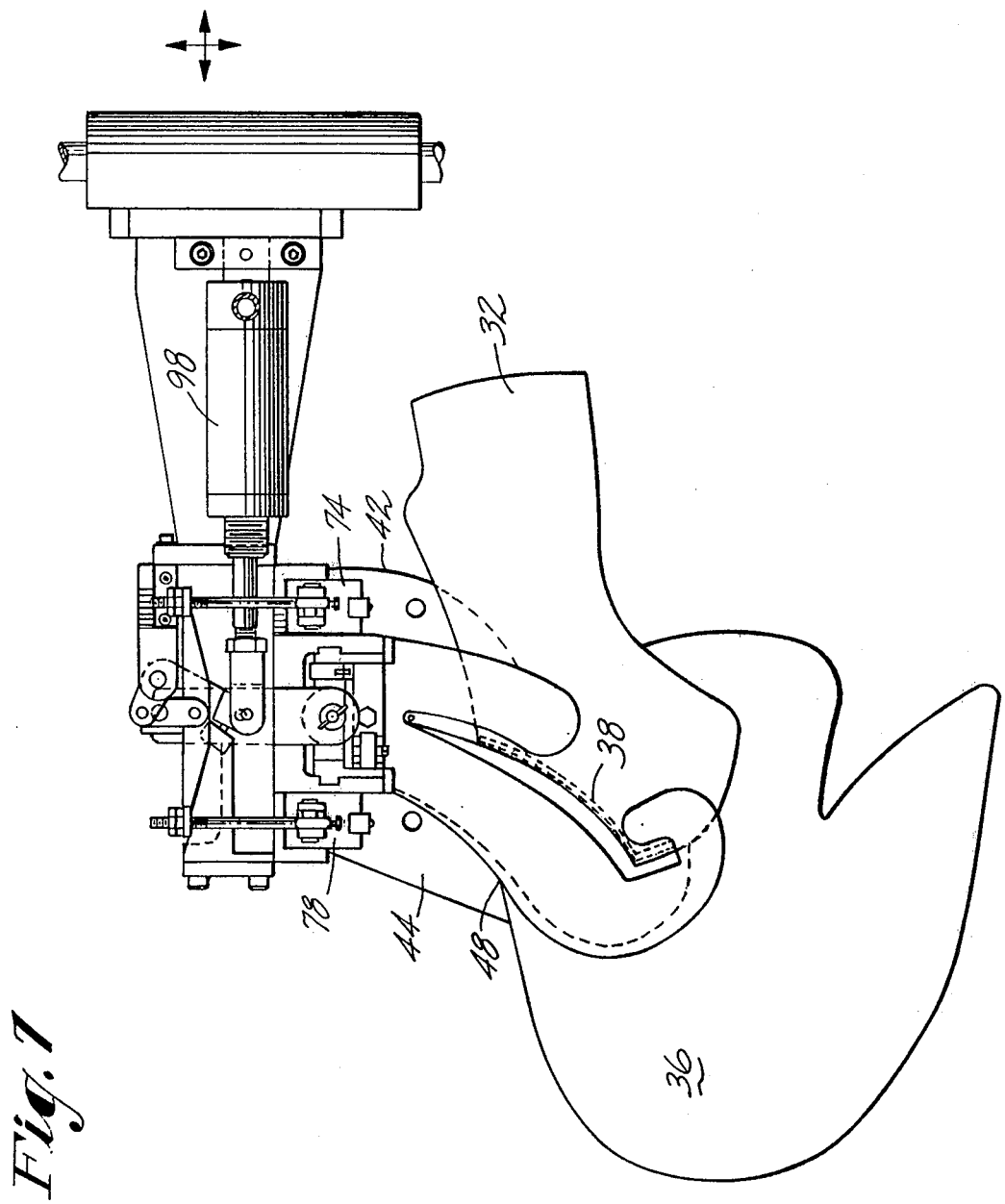
FIG. 7 is a view of the workpiece fully clamped within the sewing machine so as to permit stitching of a prescribed pattern in a given direction.

The clamped condition of the thus inserted and aligned workpiece during a sewing operation is illustrated in FIG. 7. The workpiece is seen to be clamped in such a manner as to provide substantial clamping pressure around the periphery of the normal sewing pattern 38. This is accomplished by providing the upper and lower clamps with interior contours which substantially conform to the shape of the normal sewing pattern 38.

Figure 8:
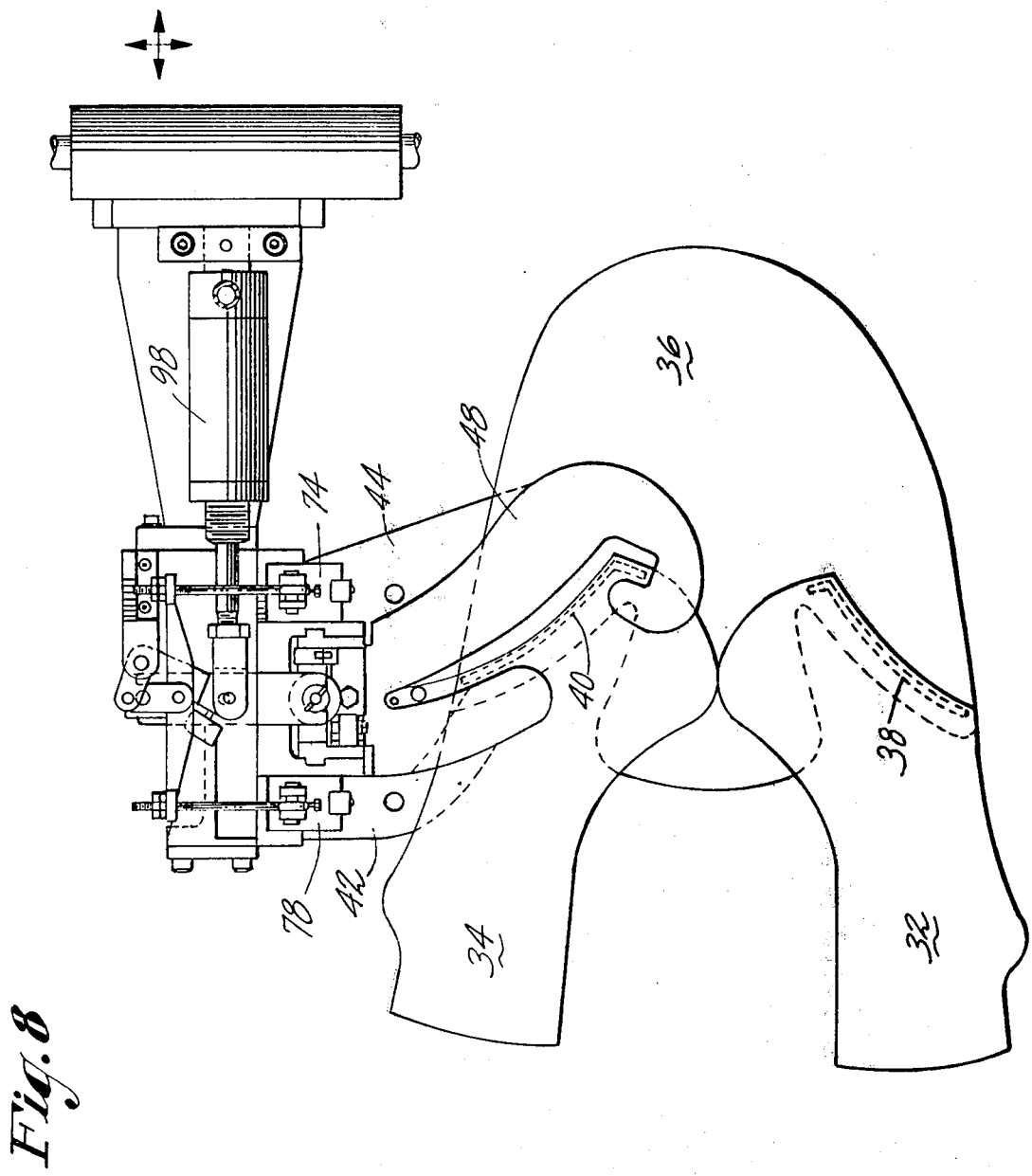
FIG. 8 is an illustration of the workpiece fully clamped within the sewing machine for stitching in the direction opposite to that of FIG. 7.

FIG. 8 depicts a workpiece which has been clamped for the sewing of the opposite sewing pattern 40. It is to be noted that all clamps have been turned over and that the lower clamp 42 is now attached to the pivotal member 78 and the lower clamp 44 is now attached to the pivotal member 74.

Figure 9:
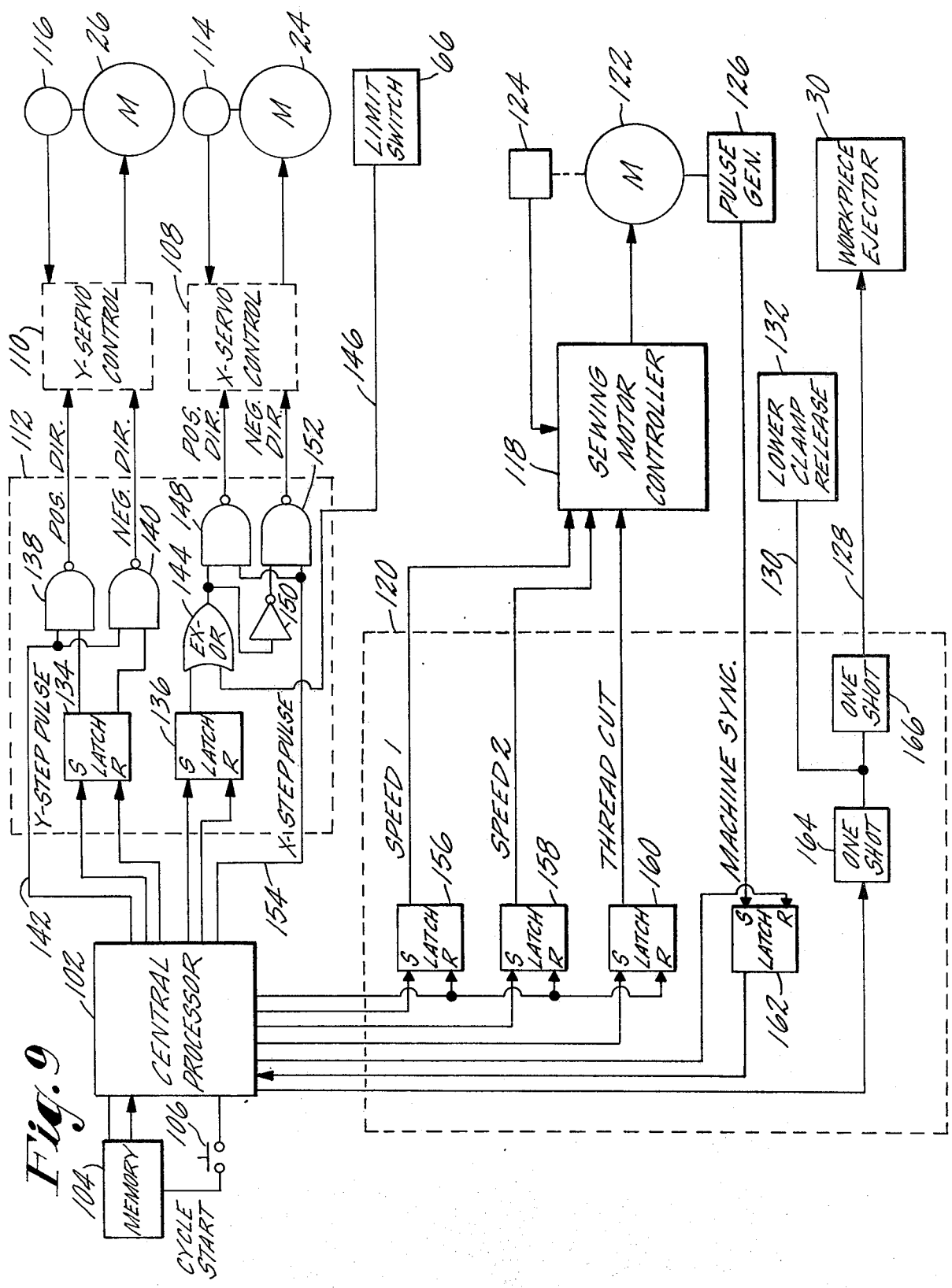
FIG. 9 is a block diagram illustration of the digital control system which controls the movement of the clamped workpiece.

Having described the manner in which the workpiece is clamped within the automatic sewing machine, it is now appropriate to turn to a description of how the workpiece is automatically sewn. The digital control system 28 for the automatic sewing machine is illustrated in block diagram form in FIG. 9. The central element of the digital control system is a central processor 102. The central processor 102 is preferably an Intel 8080 microprocessor obtainable from the Intel Corporation, Santa Clara, California.

A memory element 104 is associated with the central processor 102. This memory element 104 is preferably a programmable read only memory otherwise known as a PROM. The memory element 104 contains a digitized stitching pattern which can be used for either of the two directional stitching patterns 38 and 40 of FIG. 2. The digitized stitching pattern is sequentially processed by the central processor 102 so as to control both the movement of the clamped workpiece as well as the sewing instruments. This is initiated by a cycle start switch 106.

The central processor 102 controls an X-servo 108 and a Y-servo 110 through an interface circuit 112. The X-servo 108 controls the servo motor 24 whereas the Y-servo controls the servo motor 26. Each motor drives its respective ballscrew drive in the prescribed manner dictated by their respective servos. Positional feedback to these servos is provided by sensors 114 and 116. The sensors 114 and 116 as well as the servo motors 24 and 26 and servo controls 108 and 110 are well known elements that can be found in conventional servo systems.

The central processor 102 also provides signals to a sewing motor controller 118 via an interface circuit 120. The sewing motor controller 118 controls a sewing motor 122 having a sensor 124 which provides positional feedback to the sewing motor controller 118. The sewing motor controller 118 as well as the sewing motor 122 and positional feedback sensor 124 are well known elements that can be found in conventional sewing machines.

A pulse generator 126 is also associated with the sewing motor 122. The pulse generator 126 is preferably the combination of a Hall-effect device and a permanent magnet mounted on the sewing motor 122. The Hall-effect device is positioned relative to the permanent magnet so as to produce a pulse each time a retraction or upstroke of the sewing machine needle occurs. This pulse will hereinafter be referred to as the MACHINE SYNC pulse signal.

The workpiece ejector 30 also interfaces with the central processor 102 through the interface circuit 120. In this regard, the workpiece ejector 30 receives a signal via line 128 from the interface circuit 120 at such time as the workpiece is to be ejected. This is preceded by a signal on a line 130 to a lower clamp release 132. The lower clamp release is operative to extend the piston within the cylinder 98 of FIGS. 5 and 6 so as to thereby disengage the lower clamps 42 and 44. The workpiece ejector 30 subsequently ejects the workpiece in a manner which will be described in detail hereinafter.

Returning now to the interface circuit 112 which provides the appropriate signals to the X and Y servo controls 108 and 110. Interface circuit 112 is seen to comprise a pair of latch circuits 134 and 136. The outputs of the latch circuit 134 are applied to a pair of NAND gates 138 and 140. The NAND gates 138 and 140 also receive a Y-step pulse signal from the central processor 102 via a line 142. The output of the latch circuit 136 is applied to an exclusive OR gate 144. The exclusive OR gate 144 also receives a signal from the limit switch 66 via a line 146. The output of the exclusive OR gate 144 is directly applied to a NAND gate 148. The output of the exclusive OR gate 144 is also inverted by an inverter 150 and thereafter applied to a NAND gate 152. The NAND gates 148 and 152 also receive an X-step pulse signal from the central processor 102 via a line 154.

The functional operation of the aforementioned elements within the interface circuit 112 is as follows. The latch circuits 134 and 136 are selectively set or reset by the central processor 102 so as to indicate a positive or negative X and Y direction. In this regard, the central processor 102 sets the latch circuits 134 and 136 for positive X and Y directions and resets the same latch circuits for negative X and Y directions.

The NAND gate 138 is enabled by a set of the latch circuit 134 whereas the NAND gate 140 is enabled by a reset of the latch circuit 134. The appropriately enabled NAND gate will merely invert the Y-step pulse signal which is applied thereto via the line 142. In this manner, a pulse train will appear at the output of the NAND gate 138 for a positive Y-direction of movement whereas a pulse train will appear at the output of the NAND gate 140 for a negative Y-direction of movement.

The latch circuit 136 indicates the X-direction of movement to the exclusive OR gate 144. This indication as to direction of movement is subject to a further signal applied to the exclusive OR gate 144 from the limit switch 66 via the line 146. This signal will be logically low for a normal stitching pattern such as 38 in FIG. 2 and will be logically high for an opposite stitching pattern such as 40 in FIG. 2. These signal conditions on the line 146 will cause the exclusive OR gate 144 to merely gate the direction indicated by the latch 136 when the normal stitching pattern 38 is indicated by the limit switch 66. The exclusive OR gate 144 will invert the indicated direction from the latch 136 when the opposite stitching pattern 40 is indicated by the limit switch 66. In this manner, the NAND gate 148 will be enabled for a positive X-direction and disabled for a negative X-direction when the normal stitching pattern 38 is indicated by the limit switch 66. On the other hand, the NAND gate 152 will be enabled for a positive X-direction and disabled for a negative X-direction when the opposite stitching pattern 40 is indicated by the limit switch 66. The X-step pulses will be gated in an inverted fashion through the appropriately enabled NAND gate.

Turning now to the interface circuit 100, it is seen that this circuit comprises a series of latch circuits denoted as elements 156, 158, 160 and 162. Latch circuits 156 and 158 are responsive to set signals from the central processor 102 so as to indicate either a SPEED ONE or a SPEED TWO signal to the sewing motor controller 118. Either of these speed signals is maintained until such time as a reset signal occurs to the particular latch circuit. The latch circuit 160 is responsive to a set signal from the central processor 102 so as to produce a thread-cut signal to the sewing motor controller 118. This signal remains in effect until such time as a reset signal occurs from the central processor 102. The latch circuit 162 is set in response to a pulse from the pulse generator 126. This pulse signal is indicated as a MACHINE SYNC signal. The latch circuit 162 remains set until such time as a reset signal occurs from the central processor 102.

The interface circuit 120 also includes a pair of one-shot circuits 164 and 166. The one-shot circuit 164 produces a first pulse of predetermined width in response to a signal from the central processor 102. This first pulse is applied to the lower clamp release 132 via the line 130. The lower clamp release 132 is thereafter operative to retract the piston within the cylinder 98 of FIGS. 5 and 6 so as to thereby release the lower clamps 42 and 44. The first pulse is also applied to the one-shot circuit 166 which is triggered on the trailing edge of this pulse. In this manner, the one-shot 166 is caused to produce a second pulse on the line 128 at the predetermined time dictated by the pulse width of the first pulse from the one-shot 164. The second pulse on the line 128 causes the workpiece ejector 30 to eject the previously unclamped workpiece.

The operation of the interface circuit 120 will be discussed with respect to the overall operation of the digital control system 28. The operation of the digital control system 28 begins with a selection of a PROM or ROM memory having the appropriate digitized sewing pattern. The memory is inserted into the sewing machine so as to communicate with the central processor 102. The operator of the sewing machine next inserts a set of clamps into the opening 60 as has been previously discussed with regard to FIG. 5. If the inserted clamps define a normal stitching pattern 38, then the limit switch 66 remains off in a logically low signal state. On the other hand, if the opposite stitching pattern 40 is indicated by the inserted clamps, then the limit switch 66 is activated and a logically high signal state exists at the output of the limit switch 66. The operator now inserts and aligns the workpiece with respect to the clamps as has been previously discussed with regard to FIG. 6.

Sewing is initiated by the operator activating the start cycle switch 106. In response thereto, the central processor 102 initiates a read cycle of the digitized stitching pattern that has been stored within the ROM or PROM memory 104. In this regard, the central processor 102 reads, decodes and executes the first word which is a "start the stitcher" instruction. The central processor 102 subsequently sets the latch 156 which in turn signals the sewing motor controller 118 to initiate movement of the sewing machine needle. The upstroke of the sewing machine needle is detected by the pulse generator 126 which generates a MACHINE SYNC pulse signal that sets the latch circuit 162. The set condition of the latch circuit 162 is transmitted to the central processor 102 which acknowledges the same by resetting the latch circuit 162. The central processor now sequentially accesses a pair of words from the memory 104 defining the first respective X and Y movements. This information is preferably in two separate eight bit words, each of which includes a binary encoded direction of movement and a binary encoded magnitude off movement. The central processor 102 either sets the latches 134 and 136 for positive directions of movement or resets them for negative directions of movement. The latch circuit 134 thereafter enables either the NAND gate 138 or the NAND gate 140. The NAND gate 138 will be enabled whenever a positive Y-direction of movement is to occur. The NAND gate 140 will be enabled whenever a negative Y-direction of movement is to occur.

The X-direction of movement as indicated by the latch circuit 136 is either maintained or reversed by the exclusive OR gate 144 pursuant to the signal appearing on the line 146. In this regard, if a normal sewing pattern has been indicated by the limit switch 66, then the direction indicated by the latch circuit 146 is maintained. On the other hand, if an opposite stitching pattern is indicated by the limit switch 66, then the direction indicated by the latch circuit 148 is reversed at the output of the exclusive OR gate 144. In either instance, the exclusive OR gate 144 appropriately enables either the NAND gate 148 or the NAND gate 152.

In addition to establishing the positive or negative sense of movement for the X and Y directions, the central processor also defines the number of units of movement which are to occur in each direction. This is done by taking the respective binary encoded magnitudes of movement and storing the same within X and Y counters located internally within the central processor. The central processor subsequently generates a train of Y pulses on the line 142 and decrements its Y counter until the same reaches a count of zero. In a similar manner, the central processor also generates a train of X pulses on the line 154.

The Y pulses are applied to the NAND gates 138 and 140 via the line 142 whereas the X pulses are applied to the NAND gates 148 and 152 via the line 154. The NAND gate 138 will invert and gate the Y-step pulses to the Y-servo control 110 for a positive movement. The NAND gate 138 will invert and gate the Y-step pulses to the Y-servo control 110 for a negative movement. The Y-servo control 110 will subsequently cause the motor 26 to move the prescribed number of units of movement in the direction so indicated. In a similar manner, the X pulses will be appropriately gated by the NAND gates 148 and 152 to the X-servo control which will in turn dictate the movement of the motor 24.

It is to be noted that the servo motors 24 and 26 will implement the prescribed movement in the X and Y directions before the central processor 102 signals the sewing motor controller 118 to execute a stitching operation. This latter event occurs when the central processor sets one of the latches 156 or 158 within the interface circuit 120. The latch circuit which is set will dictate the speed at which the stitching operation is to occur. The sewing motor controller 118 subsequently initiates the stitching operation which eventually results in an upstroke or retraction of the sewing needle. The upstroke of the sewing needle causes the pulse generator 126 to produce a pulse that sets the latch circuit 162. The set condition of the latch circuit 162 signals the central processor 102 to begin reading the next stored eight bit words defining X and Y movement. The central processor will subsequently indicate the direction and number of incremental movements to be performed by the X and Y-servo controls.

Upon completion of the last stitch, the central processor will read a thread-cut instruction from the memory 102. This will result in a set signal being issued to the latch circuit 160 which in turn activates a thread-cutting procedure within the sewing motor controller 118.

A final MACHINE SYNC signal will occur following the execution of the thread cutting. This will signal the central processor 102 to read the last stored instruction in the memory 104. This last stored instruction will be a "reset command" which will cause the central processor to reset for the next cycle. Following the decoding of this command, the central processor 102 will also trigger the one-shot 164 which will in turn pulse the lower clamp release 132. The lower clamp release 132 will free the workpiece from its previously clamped condition within the sewing area. The workpiece ejector 30 will now be capable of ejecting the workpiece from the sewing area. This occurs at such time as the one-shot 166 is triggered in response to the trailing edge of the pulse from the one-shot 164. This results in a pulse being applied via the line 128 to an air valve control system within the workpiece ejector 30. The air valve control system injects air into two separate piston chambers so as to cause a prescribed ejection of the workpiece. This ejection will be described in detail hereinafter.

Figure 10:
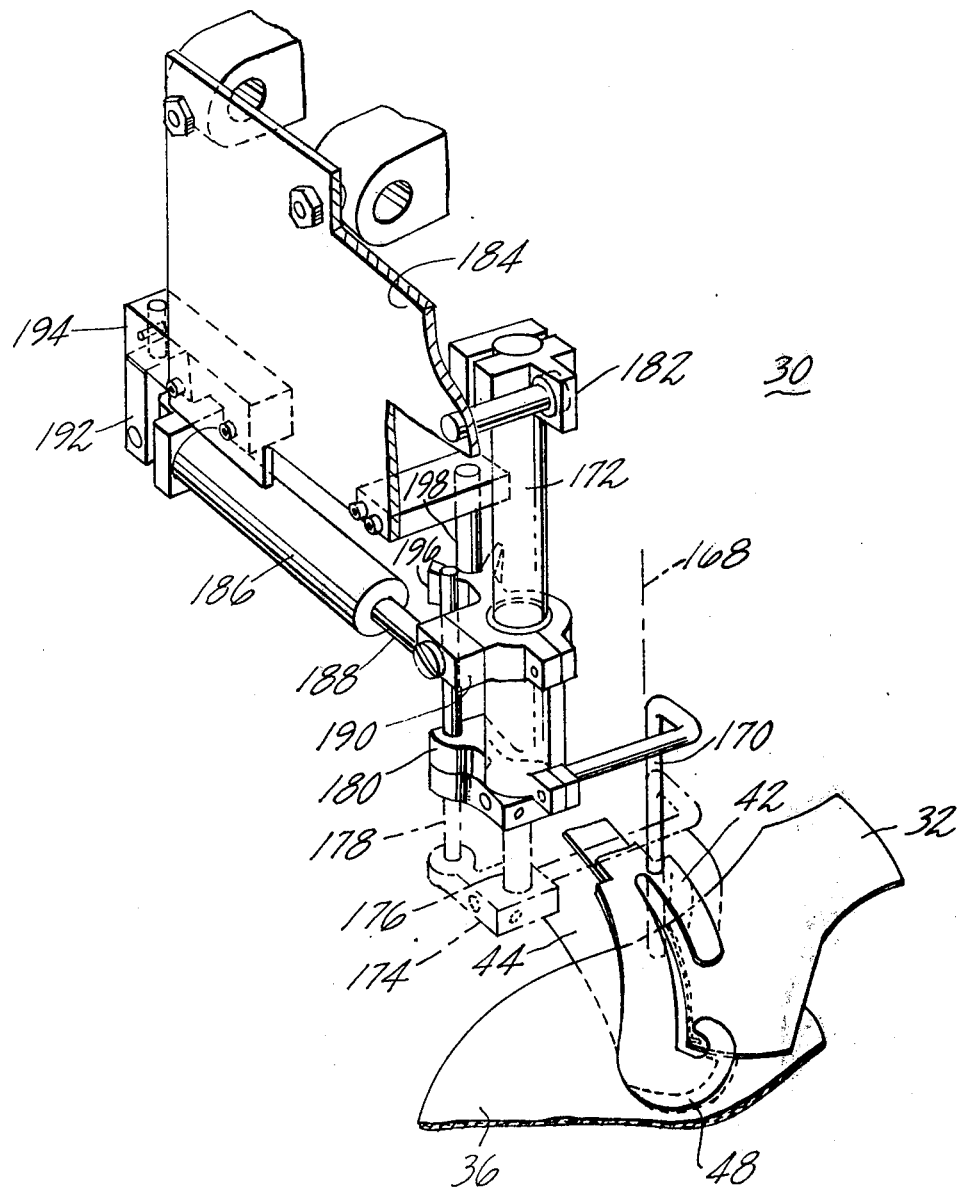
FIG. 10 is a first perspective view of the workpiece ejector.

Turning now to FIG. 10 wherein the workpiece ejector is illustrated relative to the workpiece and clamps. The workpiece is in an eject position following completion of the last stitching operation. In this regard, the workpiece has been moved subsequent to the last stitch by the sewing needle along a center line 168. The stitched workpiece is now positioned out and away from the sewing needle center line 168. It is furthermore to be appreciated that the lower clamp release 132 has been actuated so as to cause the lower clamps to rotate downwardly.

The workpiece ejector 30 contains a rod configuration 170 which is located above and slightly to the rear of the completed stitching on the workpiece. The tip of the rod configuration is driven downwardly into position behind the workpiece by a pneumatic-actuated piston within a cylinder 172. This is illustrated by the dotted outline of the rod configuration 170.

The dotted outline of the rod configuration 170 illustrates how the same is connected to the pneumatic-actuated piston within the cylinder 172. The rod configuration 170 is affixed to a terminal member 174 which is itself connected to the end of a shaft 176 constituting the output of the pneumatic piston within the cylinder 172. The shaft 176 moves downwardly when the pneumatic piston is appropriately actuated.

A guide shaft 178 is mounted on the terminal member 174 so as to extend upwardly in parallel relationship with the shaft 176. The guide shaft 178 slidably engages a guide member 180 affixed to the cylinder 172. The guide shaft 178 and guide member 180 support the shaft 176 when the same is extended in the downward direction.

Returning now to the cylinder 172 which houses the pneumatic piston, it is seen that this cylinder is rotatably mounted on a ball bearing mount 182 located outwardly from a base 184 of the workpiece ejector. The ball bearing mount 182 allows the cylinder 172 to rotate in any desired direction. In this regard, the cylinder 172 is free to pivot outwardly about the ball bearing mount 182 in response to the movement of a second pneumatic piston within a cylinder 186. This movement of the second pneumatic piston occurs at a rate significantly slower than the rate of movement of the first pneumatic piston within the cylinder 172. The differences in these rates of movement assure that the rod configuration 170 is in position behind the workpiece before any engagement with the workpiece.

The second pneumatic piston includes a shaft 188 which moves outwardly from the cylinder 186. The shaft 188 is rotatably connected through a fulcrum pin (not shown) to a collar 190 affixed to the cylinder 172. The shaft 188 is essentially free to move outward in any direction by virtue of the manner in which the base of the cylinder 186 is rotatably connected to the base 184 of the workpiece ejector. Specifically, the base of the cylinder 186 is pivotally attached to a mount 192 which is in turn rotatable about a swivel mount 194 that is affixed to the base 184 of the workpiece ejector.

It is to be noted that the collar 190 includes a Y-shaped portion 196 which extends rearwardly. This Y-shaped portion 196 engages a stop 198 extending downwardly from the base 184 of the work ejector. This defines the initial position of the cylinder 172 before the same is moved outwardly by the extension of the shaft 188.

Figure 11:
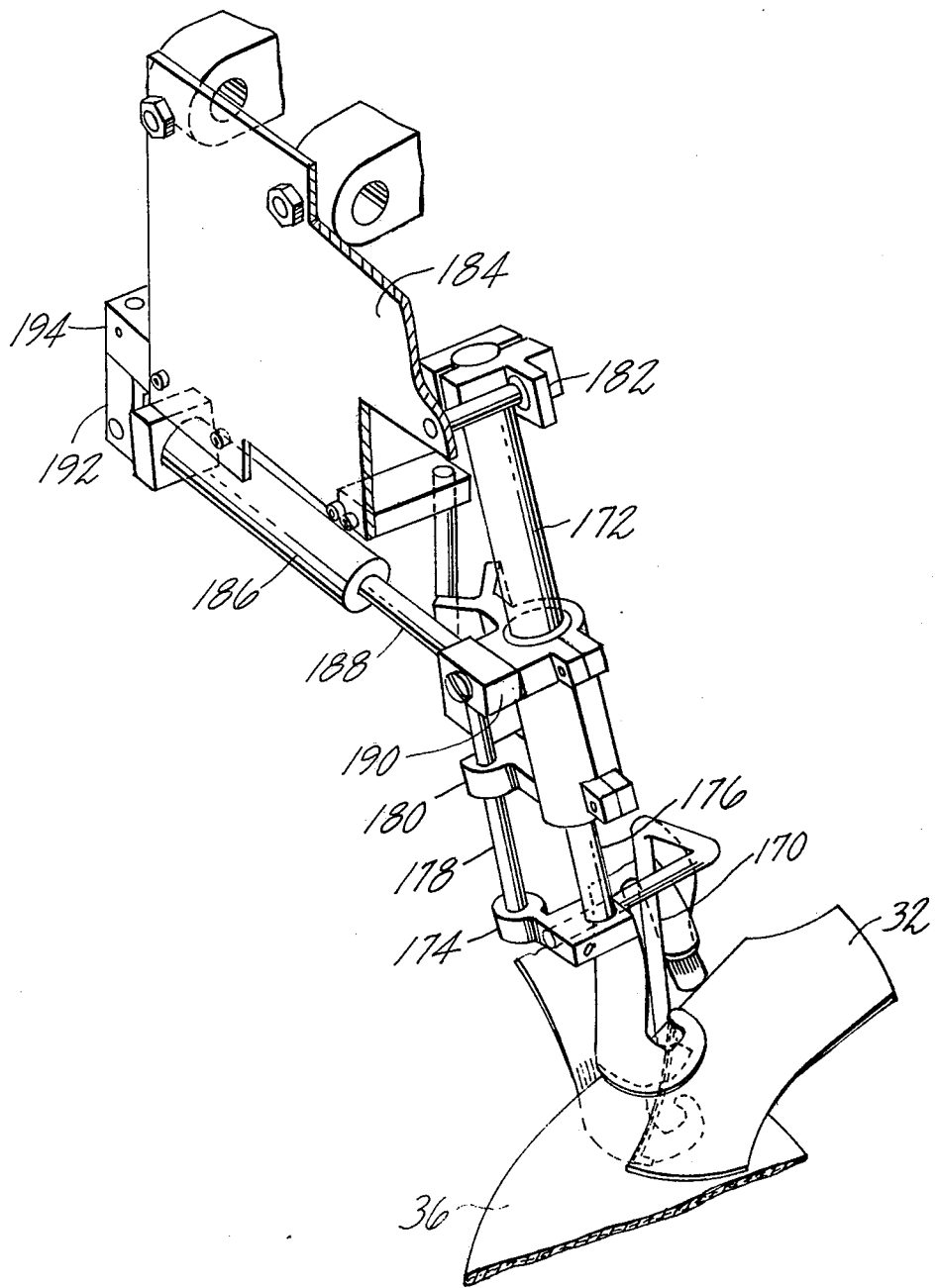
FIG. 11 is a second perspective view of the workpiece ejector.

Referring to FIG. 11, it is seen that the rod configuration 170 has moved outwardly in response to the movement of the shaft 188. In so doing, the tip of the rod configuration has engaged the interior contour of the clamps and moved the stitched workpiece outwardly. The completed workpiece freely falls out of the clamps by the time the rod configuration reaches its outermost point of travel. This free fall is, of course, also facilitated by the downward position of the lower clamp elements during ejection.

FIG. 12 illustrates the air-valve control system for the workpiece ejector 30. The control system comprises a three-way solenoid valve 200 having an output port connected to both a needle valve 202 and a flow control valve 204. The needle valve 202 is connected to the air cylinder 186 having a spring-loaded piston 206 located therein. The flow control valve 204 is connected to the air cylinder 172 having a spring-loaded piston 208 located therein.

The three-way solenoid valve 200 is controlled by a signal from the digital control system 28 appearing on the line 128. This signal will be logically high at such time as the work is to be ejected. This will energize the three-way solenoid valve 200 which will in turn channel pressurized air from its input port through to its output port. The pressurized air flow from the output port of the solenoid valve 200 moves through the flow-control valve 204 at a sufficiently rapid rate so as to cause the piston 208 to move downwardly at a rapid rate. On the other hand, the pressurized air flow through the needle valve 202 is sufficiently retarded so as to cause a relatively slow outward movement of the piston 206 within the air cylinder 186. It is to be appreciated that the air flow rates through the flow control valve 204 and the needle valve 202 are to be adjusted so as to allow for the full extension of the piston 208 before an appreciable movement of the piston 206. This will provide the necessary downward movement of the rod configuration 170 before the same moves significantly outward. It will be remembered that this is necessary in order to allow the rod configuration 170 to move behind the workpiece before moving the same outwardly.

The signal on the line 128 will drop logically low after a predefined period of time sufficient to allow for the complete ejection of the workpiece. At this time, the three-way solenoid valve 190 will switch from an intake of pressurized air through its input port to an exhaust of the built-up pressurized air through its exhaust port. The spring-loaded pistons 206 and 208 will return to fully retracted positions within their respective air cylinders. In this regard, the piston 208 will move upwardly into its cylinder 172 at a far more rapid rate than the piston 206 moves backwardly into its cylinder 178. This difference in rates of retraction is of course dictated by the flow valve 204 and the setting of the needle valve 202.

From the foregoing, it is to be understood that a preferred embodiment of an automatic sewing machine with a particularly clamped workpiece and work ejector apparatus has been illustrated. It is to be appreciated that the mechanical and electronic logic elements used therein are merely illustrative of that which may be used in the practice of the invention.

What is claimed is:

1. Apparatus for automatically sewing at least two different sewing patterns, each sewing pattern consisting of a sequence of stitching points on a workpiece, said apparatus comprising:
   means for storing digital information which cooperatively defines the sequence of stitching points for only one of the two different sewing patterns;
   means for accessing the stored digital information, said accessing means being operative to produce at least one signal for the positioning of a workpiece at each point wherein a stitching operation is to be performed;
   means for selectively altering the positioning signal produced by said accessing means in response to an indication of the sewing pattern to be sewn; and
   means, responsive to the selectively altered positioning signal, for moving the workpiece.

2. The apparatus of claim 1 further comprising:
   means for indicating to said means for selectively altering the positioning signal which of the two different sewing patterns is to be sewn.

3. The apparatus of claim 2 wherein said means for selectively altering the positioning signal comprises:
   means, responsive to the pattern indication from said means for indicating which pattern is to be sewn, for selectively gating the positioning signal produced by said accessing means.

4. The apparatus of claim 3 wherein said accessing means is furthermore operative to produce a direction indication in association with the positioning signal and wherein said selective gating means comprises:
   first gating means for gating the positioning signal in response to a first direction indication from said accessing means; and second gating means for gating the positioning signal in response to a second direction indication from said accessing means.

5. The apparatus of claim 4 wherein said selective gating means further comprises:
means, responsive to the pattern indication from said means for indicating which pattern is to be sewn, for reversing the direction indication from said accessing means.

6. The apparatus of claim 5 wherein said means for indicating which pattern is to be sewn is operative to generate a bilevel pattern indicating signal having a first logic level indicating a first pattern and a second logic level indicating a second pattern and said means for reversing the direction indication from said accessing means comprises:
means, responsive to the second logic level of the pattern indicating signal, for reversing the direction indication from said accessing means.

7. The apparatus of claim 6 wherein the positioning signal produced by said accessing means is a train of pulses defining the prescribed distance that a workpiece is to be moved in an indicated direction between successive stitching operations.

8. The apparatus of claim 1 further comprising:
means for performing a stitching operation;
means for detecting the completion of a stitching operation; and
means, responsive to the detection of the completion of a stitching operation, for synchronizing the accessing of further digital information from said storage means by said accessing means, the further digital information relating to the positioning of the workpiece at a point wherein the next stitching operation is to be performed.

9. The apparatus of claim 8 wherein said means for detecting the completion of a stitching operation comprises:
means for generating a pulse signal indicating that sewing needle movement has occurred.

10. The apparatus of claim 9 wherein said synchronizing means comprises:
bistable means for producing an output signal having a first signal state in response to the pulse signal from said means for generating a pulse signal indicating that sewing needle movement has occurred, said bistable means being operative to produce a second output signal state in response to a reset signal from said accessing means.

11. The apparatus of claim 1 further comprising:
means for ejecting the workpiece, said ejecting means being operative to eject the workpiece following the completion of the last stitching operation.

12. The apparatus of claim 11 wherein said means for ejecting the workpiece comprises:
means for engaging the workpiece;
first actuator means for driving said means for engaging the workpiece into position relative to the completed workpiece; and
second actuator means for driving said first actuator means and said means for engaging the workpiece in an outward fashion so as to thereby move the workpiece outwardly from the sewing area of the sewing machine.

13. The apparatus of claim 12 further comprising:
means for controlling the rates of movement of said first and second actuator means, said control means being operative to establish a rate of movement for said first actuator which is substantially greater than the rate of movement for said second actuator means.

14. The apparatus of claim 11 further comprising:
means, responsive to a signal from said accessing means, for generating a first pulse signal;
means, responsive to the first pulse signal for decreasing the clamping pressure on the workpiece;
means, responsive to the termination of the first pulse signal for generating a second pulse signal which triggers said means for ejecting the workpiece.

15. The apparatus of claim 14 wherein said means for ejecting the workpiece comprises:
means for engaging the workpiece;
first actuator means for driving said means for engaging the workpiece into position relative to the completed workpiece; and
second actuator means for driving said first actuator means and said means for engaging the workpiece in an outward fashion so as to thereby move the workpiece outwardly from the sewing area of the sewing machine.

16. The apparatus of claim 15 further comprising:
a first valve means, connected to said first actuator means, for controlling the movement of said first actuator means at a first rate; and
a second valve means, connected to said second actuator means, for controlling the movement of said second actuator means at a second rate which is substantially less than the first rate.

17. The apparatus of claim 1 further comprising:
means for clamping a workpiece, said clamping means having means for indicating to said means for selectively altering the positioning signal which pattern is to be sewn.

18. The apparatus of claim 17 wherein said means for selectively altering the positioning signal comprises:
means for sensing said pattern indication means, said sensing means being operative to produce a pattern indicating signal; and
means, responsive to the pattern indicating signal, for selectively gating the positioning signal produced by said accessing means.

19. The apparatus of claim 18 wherein said accessing means is furthermore operative to produce a direction indication in association with the positioning signal and wherein said selective gating means comprises:
first gating means for gating the positioning signal in response to a first direction indication from said accessing means; and
second gating means for gating the positioning signal in response to a second direction indication from said accessing means.

20. The apparatus of claim 19 wherein said selective gating means further comprises:
means, responsive to the pattern indicating signal, for reversing the first and second direction indications from said accessing means.

21. The apparatus of claim 1 further comprising:
a plurality of clamping means for securing and holding the workpiece, said plurality of clamping means being arranged in different configurations so as to allow for the sewing of the different sewing patterns, at least one of said plurality of clamping means having means for indicating particular clamping configurations to said means for selectively altering the positioning signal.

22. The apparatus of claim 21 wherein said means for selectively altering the positioning signal comprises:
   means for sensing said means for indicating particular clamping configurations, said sensing means being operative to produce a pattern indicating signal; and
   means, responsive to the pattern indicating signal for selectively gating the positioning signal produced by said accessing means.

23. The apparatus of claim 22 wherein said one of said plurality of clamping means having means for indicating particular clamping configurations comprises:
   at least one clamping member having a symmetrically shaped portion which inserts into said means for moving the workpiece, said symmetrically shaped portion having opposing edge contours wherein only one edge contour contains a notch.

24. The apparatus of claim 23 wherein the symmetrically shaped portion of said clamping member is inserted into said moving means in a first manner for the sewing of a first pattern and is inserted into said moving means in a second manner for the sewing of a second pattern, said clamping member being turned over when the second pattern is to be sewn following completion of the first pattern, the turned over condition resulting in an exchange of positions of the opposing edge contours within the moving means.

25. The apparatus of claim 24 wherein said means for moving the workpiece further comprises:
   means for receiving the symmetrically shaped portion of said clamping member; and
   engaging means, located within said receiving means so as to freely extend into the notch when said symmetrically shaped portion is inserted into said receiving means in the first manner for the sewing of the first pattern, and for engaging the unnotched edge contour when said symmetrically shaped portion is inserted into said receiving means in the second manner.

26. The apparatus of claim 25 wherein said sensing means furthermore comprises:
   means for producing a signal indicating the second pattern is to be sewn in response to the engaging means contacting said unnotched edge contour.

27. The apparatus of claim 26 wherein said means for selectively altering the positioning signal comprises:
   means, responsive to the signal indicating the second pattern is to be sewn, for selectively gating the positioning signal produced by said accessing means.

28. A system for controlling the stitching of a workpiece, said system comprising:
   a plurality of means for clamping the workpiece so as to allow for the stitching of a sewing pattern;
   means for receiving and holding said plurality of clamping means, said receiving and holding means being capable of receiving said plurality of clamping means in at least one alternative arrangement;
   means for sensing the orientation of at least one of said plurality of clamping means when received by said means for receiving and holding said plurality of clamping means; and
   means, responsive to said sensing means, for moving said receiving and holding means so as to successively position the workpiece for the stitching of the sewing pattern.

29. The system of claim 28 wherein said means for moving said receiving and holding means comprises:
   means for generating a sequence of movements through which said receiving and holding means is to be moved; and
   means, responsive to said means for sensing the orientation of at least one of said plurality of clamping means for establishing directions of movement associated with the sequence of movements.

30. The system of claim 29 wherein said means for generating a sequence of movements comprises:
   means for producing at least one signal defining the amount of movement and at least one signal initially defining the direction of movement, the initial direction of movement being applied to said means for establishing directions of movement.

31. The system of claim 30 wherein said means for establishing directions of movement comprises:
   means for selectively reversing the initial direction of movement in response to said means for sensing the orientation of at least one of said plurality of clamping means.

32. The system of claim 30 wherein said means for moving said receiving and holding means further comprises:
   means, responsive to said means for establishing directions of movement, for selectively gating the signals defining the amount of movement; and
   means, responsive to the selectively gated signals, for driving the receiving and holding means the defined distance in the established direction.

33. The system of claim 28 wherein said plurality of means for clamping the workpiece comprises:
   at least one clamping means having a symmetrically shaped portion which inserts into said receiving and holding means, said symmetrically shaped portion having opposing edge contours wherein only one edge contour contains a notch, said symmetrically shaped portion being sensed by said sensing means.

34. The system of claim 29 wherein said means for sensing the orientation of at least one of said clamping means comprises:
   engaging means, located within said receiving and holding means so as to freely extend into the notch when said symmetrically shaped portion is inserted into said receiving and holding means in a first manner and for engaging the unnotched edge contour of said symmetrically shaped portion when said symmetrically shaped portion is inserted into said receiving and holding means in a second manner.

35. The system of claim 34 wherein said clamping means having a symmetrically shaped portion furthermore comprises:
   a clamping portion conforming to the periphery of a first sewing pattern when said symmetrically shaped portion is inserted into said receiving and holding means in the first manner and conforming to the periphery of a second sewing pattern when said symmetrically shaped portion is inserted into said receiving and holding means in the second manner.

36. The system of claim 35 wherein said means for sensing the orientation of at least one of said clamping means further comprises:
   means responsive to said engaging means for producing a bilevel pattern indicating signal having a first signal level when the first pattern is to be sewn and having a second signal level when the second pattern is to be sewn, the patterns being determined by the insertion of said symmetrically shaped portion.

37. The system of claim 36 wherein said means for moving said receiving and holding means comprises:
means for generating a sequence of movements through which said receiving and holding means is to be moved; and
means, responsive to the bilevel pattern indicating signal for establishing directions of movement associated with the sequence of movements.

38. The system of claim 37 wherein said means for generating a sequence of movements is operative to produce at least one signal defining the amount of movement and at least one signal initially defining the direction of movement and said means for establishing directions of movement comprises:
means for selectively reversing the signal initially defining the direction of movements in response to the bilevel pattern indicating signal.

39. The system of claim 38 wherein said means for moving the workpiece further comprises:
means, responsive to said means for establishing directions of movement, for selectively gating the signals defining the amount of movement; and
means, responsive to the selectively gated signals, for driving the receiving and holding means the defined distance in the established direction.

40. Apparatus for automatically ejecting a completed workpiece from a sewing machine, said apparatus comprising:
means for engaging the workpiece;
first actuator means for driving said engaging means into a position relative to the workpiece; and
second actuator means, connected to said first actuator means, for driving said first actuator means and said engaging means outwardly so as to thereby move the workpiece outwardly from the sewing area of the sewing machine.

41. The apparatus of claim 40 further comprising:
means for controlling the rates of movement of said first and second actuator means, said control means being operative to establish a rate of movement for said first actuator which is substantially greater than the rate of movement for said second actuator means.

42. The apparatus of claim 41 wherein said first and second actuators are pneumatically controlled actuators and said means for controlling the rates of movement comprises:
a first valve means, connected to said first actuator means, for controlling the flow of air into said first actuator means at a first rate; and
a second valve means, connected to said second actuator means, for controlling the flow of air into said second actuator at a second rate whereby the second rate is substantially greater than the first rate.

43. The apparatus of claim 42 wherein said means for controlling the rates of movement furthermore comprises:
a three-way valve having an output port connected to both said first and second valve means so as to provide an equalized air pressure thereto, said three-way valve being operative to cause air to flow into the first and second valve means for a first setting and to cause air to discharge out of said first and second valve means for a second setting.

44. The apparatus of claim 43 further comprising:
means for securely clamping the workpiece during a sewing operation;
means for releasing the clamping pressure exerted on the workpiece by said clamping means following the completion of a sewing operation; and
means for activating the three-way valve, when the workpiece is to be ejected following release of the clamping pressure exerted by said clamping means.

45. The apparatus of claim 40 wherein said first actuator means includes a shaft which connects to said means for engaging the workpiece so that an appropriate extension of said shaft results in a movement of said engaging means into position relative to workpiece.

46. The apparatus of claim 45 further comprising:
means, attached to said first actuator means, for supporting the shaft of said first actuator means when said shaft is appropriately extended into position relative to the workpiece.

47. The apparatus of claim 46 wherein said means for supporting the shaft comprises:
a guide positioned parallel to said shaft of said first actuator means; and
means, attached to said first actuator means, for slidably engaging said guide so as to maintain the parallel relationship of said guide with respect to said shaft of said first actuator means.

48. The apparatus of claim 40 further comprising:
means for rotatably mounting said first actuator means to said sewing machine so that said first actuator means is free to rotate as the workpiece is moved outwardly; and
means for rotatably mounting said second actuator means to said sewing machine so that said second actuator means is free to rotate as the workpiece is moved outwardly.

49. The apparatus of claim 48 wherein said second actuator means includes an output shaft having an end rotatably connected to said first actuator means so as to allow for a relative rotation of said first actuator means with respect to said second actuator means.

50. The apparatus of claim 49 further comprising:
means for establishing a position for said first actuator means when said output shaft of said second actuator means is retracted following the ejection of the workpiece.

* * * * *